May 4, 1926.

G. H. HIGGINS

SHOCK ABSORBER

Original Filed July 6, 1925

1,583,253

Inventor
George H. Higgins
By Wilson & McCann Attys.

Patented May 4, 1926.

1,583,253

UNITED STATES PATENT OFFICE.

GEORGE H. HIGGINS, OF ROCKFORD, ILLINOIS, ASSIGNOR TO BURD HIGH COMPRESSION RING COMPANY, OF ROCKFORD, ILLINOIS, A CORPORATION OF ILLINOIS.

SHOCK ABSORBER.

Application filed July 6, 1925, Serial No. 41,575. Renewed March 6, 1926.

*To all whom it may concern:*

Be it known that I, GEORGE H. HIGGINS, a citizen of the United States, residing at Rockford, in the county of Winnebago and State of Illinois, have invented certain new and useful Improvements in Shock Absorbers, of which the following is a specification.

This invention relates to devices which are variously known on the market as rebound or recoil checks, snubbers, shock absorbers, etc., constructed for the purpose of checking the recoil of vehicle and other springs after they have been compressed or expanded, and more particularly pertains to devices of this character, utilizing a flexible strap for connection of the device between two relatively movable members of the vehicle.

Modern tendencies in the design of vehicles, particularly automotive vehicles, are toward the provision of shorter and more rigid springs for front axle and body assemblies and toward larger, longer and more flexible springs for rear axle and body assemblies. These innovations, together with the advent of the balloon tire, have resulted in much easier riding qualities of the vehicle, but have introduced a new problem that is well recognized. This is the creation of "billowing" actions and reactions in the riding qualities of the vehicle and also the creation of a proportionately greater spring action on smooth roads than do rigid, short springs and hard tires. There thus arises the necessity of providing a different type of shock absorber, operating on principles very different from those known at the present time, wherein the retarding action is slow in taking effect and instantaneous in action when their operative function actually takes effect.

Considering for an instant, shock absorbers of the ordinary, flexible strap type, which are adapted to have one portion anchored on one of two relatively movable portions of an automobile and the strap or flexible cable member anchored on the other of such relatively movable portions, it will be noted that they embody the principles of levers of the second class; i. e. those in which the weight is placed between the fulcrum point and the point of power application. This arrangement permits a time lag or lost motion to occur between the point of time of application of the power and the point of time of gripping of the friction elements of the shock absorber, due to mechanical imperfections of the mechanism and stretching of the strap or cable. It will be appreciated that shock absorbers cannot be practically made to operate in the exact manner of their theoretical design. This time lag or lost motion between the point of application of the power and the point where the friction elements begin to actually perform their function, permits the body or spring of the vehicle when meeting with a depression or unevenness in the road surface, to attain considerable momentum in its rebound and expanding movements, before the friction elements or the spring or other retriever elements come into play to check the recoil or to retrieve the strap respectively. The design of these types of shock absorbers, having been such that the friction elements did not come into immediate effective play, they afforded an extremely sudden checking of the rebound action of the spring and vehicle when they did begin to act, thereby stimulating rigid and uncomfortable riding qualities.

With my invention I am enabled to overcome the defects enumerated above, as well as many others, and provide a shock absorber of such character and principles of operation, that the recoil will be substantially instantaneously checked with increasing force and in such a manner, that while the check is applied instantaneously upon recoil of the spring of the vehicle, it is of minimum value at its point of initial application and gradually increases in value in accordance with characteristics of the spring and its recoil movements.

With the foregoing in mind, one of the objects of my invention, is to provide a shock absorber or the like, operative upon the principle of levers of the third class with their distinguishing feature of application of the power between the fulcrum and the weight whereby I am enabled to obtain a more nearly instantaneous snubbing effect, do away with the time lag or lost motion between the time when the rebound action of the spring begins and the time when the snubbing device becomes effective and proportionately increase the rebound checking action from minimum to maximum values as the rebound or recoil of the spring increases in momentum or force. In other words, my principal object is to amplify, rather than decrease, movements of the strap, cable or other flexible, power applying element, so that for slight angular movements of the strap or cable, a greater corresponding movement tends to occur between the surfaces which produce the snubbing effect.

Another object is to provide a shock absorber of the flexible strap or cable type in accordance with the above noted well known principle of mechanism which will overcome the many disadvantages of all prior constructions of the same type, while retaining their advantages.

A still further object is to provide a novel construction of shock absorber of the character specified which may be arranged with the outside element or drum rigidly connected to the frame of a vehicle in order to give greater stability, rigidity and other advantages, hitherto unattained in any prior construction and to provide a construction simple in parts and operation.

Many other objects and advantageous features of the invention should become readily apparent from the description and claims and from the drawing in which:

Figure 1:
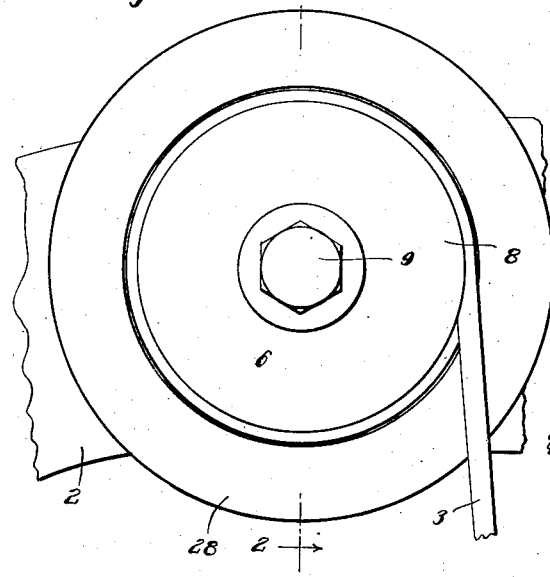
Fig. 1 is a view partly in side elevation and partly in section of a portion of the chassis of a vehicle and vehicle axle having a shock absorber constructed in accordance with a preferred from of the invention applied thereto.

I have shown a preferred form of my invention applied upon the frame 2 of an automobile chassis and connected by means of a flexible strap, cable or the like 3 through a special mounting device 4 to the axle 5 of the vehicle which is in turn connected to the spring thereof. The shock absorber proper, generally designated 6, includes two telescoping cup shaped drums or members 7 and 8, and a bearing stud 9 secured to one member or drum in such a manner that the drum 8 may rotate with respect to the drum 7. The bearing stud 9 is adapted to pass through the drum 8 with the drum 7 and is screwed or otherwise secured through the drum 7 and the L-shaped bracket 10 to hold the parts together. The bracket 10 is provided with dowels 11 for reception in corresponding recesses formed in the rear of the drum 7 to lock it against rotation. And it is also provided with bolts, rivets or other securing means 12 whereby it may be adjustably secured to a second L-shaped bracket 13 provided with a flange 14 and adapted to be secured to the frame 2 of the machine. On the inner periphery of the cylindrical flange 15 of the drum 7 a helical spring 16 is secured at one end by rivets 17 while its inner end is left free for the purpose to be hereinafter described.

The outer drum 8 is provided with a pulley surface formed by a cylindrical flange 18 and may be grooved as indicated at 19 and recessed as at 20 to receive the cable 3 wound therein and secured thereto, respectively The drum 8 is also provided with an outwardly offset cylindrical portion 21 to which a cylindrical friction band 22 may be secured as by means of rivets 23.

Figure 4:
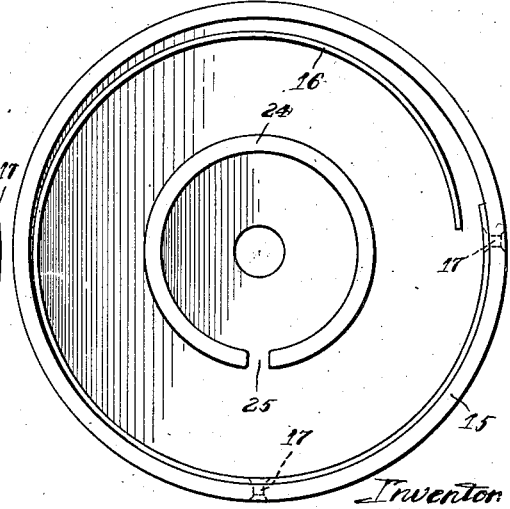
Fig. 4 is a plan view of the stationary drum showing one method of attaching the one-way friction inducing element.

Each drum is preferably provided with an internal circular flange 24, concentric with the cylindrical flanges 15—18—and 21 and each of these internal flanges is cut away as shown at 25 in Fig. 4, for the reception of the bent or hooked ends 26 of the coiled spring 27 serving to retrieve the rotatable drum 8 and to absorb or take up the slack of the cable 3 during compression movements of the vehicle or other spring to which the cable 3 may be connected. The slots or cut away portions 25 of the flanges 24 are so arranged with respect to one another and to the ends of the spring 27 that upon the assembly of the drum 8 with the spring 27 within the drum 7, the ends of the spring will adjust themselves within the slots or cut away portions 25 in proper relation one with the other. These flanges 24 also aid in maintaining drum 8 concentrically aligned with respect to the drum 7 as well as serve to retain the spring 27 in its proper position.

In order to keep the mechanism in substantially dust proof condition I prefer to enclose the telescoping edges of the two drums within the cylindrical band 28 which band has a circumferential flange extending radially inward toward the pulley surfaces of the drum 8. This band 28 may be formed of any suitable material which is preferably stamped from sheet metal and formed with a suitable number of lug portions 29 which after assembling of the parts, may be bent down to secure the housing about the drums.

Figure 2:
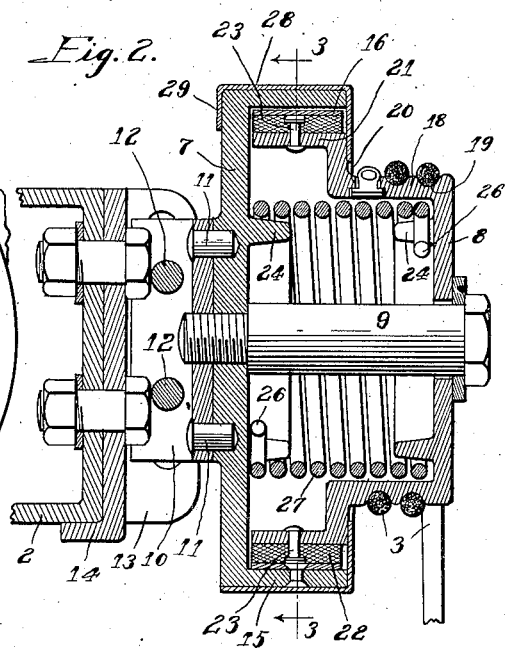
Fig. 2 is a sectional view taken on the line 2—2 of Fig. 1.
Figure 3:
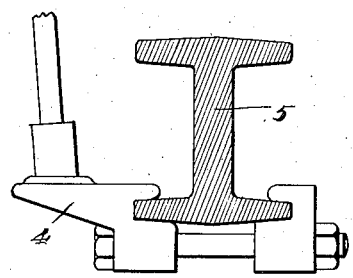
Fig. 3 is a sectional view taken on the line 3—3 of Fig. 2.
Figure 3:
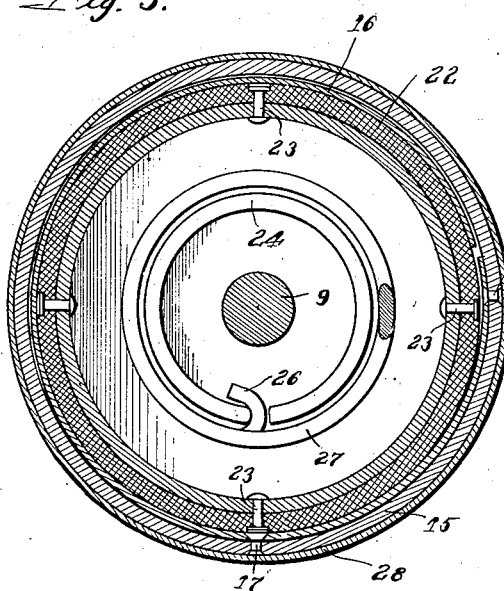

When the shock absorber has been assembled as shown in Fig. 2 with the stationary drum 7 rigidly connected with the frame of the machine, the cable 3 is connected to the drum 8 and wound thereabout to the desired or necessary number of turns and connected to the axle or other movable member of the automobile and the requisite tension placed upon the spring 27 by adjustment of the bolts 12 in the bracket 13 or in any other manner.

It will thus be apparent that when the vehicle spring compresses or as the portion 2 of the automobile approaches the portion 5, the drum 8 will rotate in a counter clockwise direction, viewing Fig. 1, absorbing the slack of cable 3 and winding it upon the pulley surface 18. During this movement the friction material 22 engaging with the inner surface of the helical spring 16 will tend to urge said spring outwardly toward the inner surface of the flange 15 which will then permit rotation of the drum 8 in this direction. When the vehicle spring gives its recoil movement, carrying the body frame member 2 upwardly away from the axle 5, tension will be placed upon the cable 3 and the drum 8 will tend to rotate in a clockwise direction. Under the influence of the friction material 22, the spring 16 will tend to coil inwardly and to be reduced in its diametric span, thereby gripping and increasingly tightening upon the friction surfaces and effectually snubbing or braking movement of the drum 8 in a clockwise direction.

From the foregoing it will be apparent that I have provided a unique construction for a shock absorber embodying among its many features, a compact and rigid structure, a mechanism easy to manufacture and one that is both economical in production and use. Some of the principles of operation, while not broadly new, are new in so far as they are embodied in the construction illustrated or in any construction similar thereto or within the terms of the appended claims and for this reason I do not wish to be limited by the construction illustrated and described.

I claim:

1. A shock absorber comprising, a stationary drum having a cylindrical flange, a helical spring element within and secured to said flange at one end, the inner end of said element being unsecured, a rotatable drum having a cylindrical flange fitting within said stationary drum and spring element, and a friction surfacing between the flange on said rotatable drum and said spring element and secured to said rotatable drum flange, whereby rotary movement of said rotatable drum in one direction will produce frictional gripping between said drums.

2. A shock absorber comprising, a stationary drum having a cylindrical flange, a helical spring element within and secured at one end to said flange, the inner end of said spring element being unsecured, a rotatable drum having a cylindrical flange adapted to fit within the flange of the stationary drum and spring element, a pulley surface on said rotatable drum of less diameter than the outside diameter of the flanged portion thereof, friction material secured to the outer face of the flange of the rotatable drum and adapted to contact with said spring element, and means for engaging said surface for rotating said rotatable drum in one direction whereby said spring and friction material will frictionally retard rotary motion of said rotatable drum.

3. A shock absorber comprising, a stationary drum having a cylindrical flange, a helical spring element within and secured by one end to said flange, the inner end of said spring element being unsecured, a rotatable drum having a cylindrical flange adapted to fit within the flange of the stationary drum and spring element, a pulley surface on said rotatable drum of less diameter than the outside diameter of the flange portion thereof, friction material secured to the outer face of the flange of the rotatable drum and adapted to contact with said drum element, means for engaging said pulley surface for rotating said rotatable drum in one direction whereby said spring and frictional material will sufficiently retard rotary motion of said rotatable drum, and means adapted to automatically return said rotatable drum to its initial position upon release of said means for rotating said rotatable drum.

4. In a shock absorber, a stationary cylindrical drum, an axial bearing stud centrally disposed relative to said stationary drum, a cylindrical drum mounted for rotation on said stud, said drums telescoping one with the other, a friction surface on one of said drums, a resilient helical member connected at one end to the other of said drums and free at its other end to move circumferentially for gripping and releasing from said friction surface, said resilient member being adapted to frictionally interengage said drums upon rotation of said rotary drum in one direction and for release thereof upon rotation of said rotary drum in the opposite direction, and means for rotating said rotary drum in one direction.

5. In a shock absorber, a stationary cylindrical drum, an axial bearing stud fixed with said stationary drum, a cylindrical drum mounted for rotation on said stud, said drums telescoping one within the other, a friction surface on one of said drums, a resilient, helical member connected at one end to the other of said drums and free at its inner end to move circumferentially for gripping and releasing from said friction surface, said resilient member being adapted to frictionally interengage said drums upon rotation of said rotary drum in one direction and for release thereof upon rotation of said rotary drum in the opposite direction, means for rotating said rotary drum to produce said frictional interengagement of both drums, and means for rotating said rotary drum in the opposite direction.

6. In a shock absorber, a stationary cylindrical drum, an axial bearing stud fixed with said stationary drum, a cylindrical drum mounted for rotation on said stud, said drums telescoping one within the other, a frictional surface on one of said drums, a helical spring of substantially the same length as the circumferential distance of the inside surface circumference of the outside drum connected at its outer end to the outside drum and having its inner end unsecured, said spring being adapted to frictionally interengage said drums upon rotation of said rotary drum in one direction and for release thereof upon rotation of said rotary drum in the opposite direction, and means for rotating said rotary drum in both directions.

7. In a shock absorber, a stationary drum, having a cylindrical flange, an axial bearing stud concentric with said flange and fixed with said drum, a second drum having a cylindrical flange of less diameter than the cylindrical flange of said stationary drum mounted for rotation on said stud and in telescoping relation to the stationary drum and providing a chamber therebetween, a friction surface on said rotatable drum, a resilient, helical member connected at one end to the inner face of the flange of said stationary drum and extending into unattached connection with said friction surface, said resilient member being adapted to frictionally interengage said drums upon rotation of said rotary drum in one direction and for release thereof upon rotation of said rotary drum in the opposite direction, and means for rotating said rotary drum in opposite directions.

In witness of the foregoing I affix my signature.

GEORGE H. HIGGINS.